(12) United States Patent
Prince et al.

(10) Patent No.: US 7,734,078 B2
(45) Date of Patent: Jun. 8, 2010

(54) SYSTEM AND METHOD FOR GENERATING COMPOSITE SUBSTRACTION IMAGES FOR MAGNETIC RESONANCE IMAGING

(75) Inventors: Martin R. Prince, New York, NY (US); Ramin Zabih, New York, NY (US); Yi Wang, Pittsburgh, PA (US); Richard Watts, Christchurch (NZ); Junhwan Kim, Seoul (KR); Jeff Bezanson, Scarsdale, NY (US); Hale Ersoy, Chestnut Hill, MA (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 12/475,797

(22) Filed: Jun. 1, 2009

(65) Prior Publication Data

US 2009/0245606 A1 Oct. 1, 2009

Related U.S. Application Data

(62) Division of application No. 10/664,425, filed on Sep. 17, 2003, now Pat. No. 7,545,967.

(60) Provisional application No. 60/412,032, filed on Sep. 18, 2002.

(51) Int. Cl.
*G06K 9/00* (2006.01)

(52) U.S. Cl. .................. 382/130; 382/128; 382/131; 382/280; 382/284; 600/425; 600/429; 600/410; 600/419; 600/407; 378/21; 378/27; 378/4; 378/62

(58) Field of Classification Search .................. 382/128, 382/131, 130, 280, 284; 600/425–429, 420, 600/410, 419, 407; 345/810
See application file for complete search history.

(56) References Cited

U.S. PATENT DOCUMENTS

| 4,878,115 | A | 10/1989 | Elion |
| 6,192,264 | B1 | 2/2001 | Foo et al. |
| 6,246,897 | B1 | 6/2001 | Foo et al. |
| 6,493,569 | B2 * | 12/2002 | Foo et al. .................. 600/410 |
| 6,658,280 | B1 * | 12/2003 | Haacke .................. 600/410 |

(Continued)

OTHER PUBLICATIONS

U.S. Appl. No. 10/664,425, Response filed Oct. 27, 2008 to Final Office Action mailed Jul. 7, 2008, 9 pgs.

(Continued)

*Primary Examiner*—Wesley Tucker
*Assistant Examiner*—Nancy Bitar
(74) *Attorney, Agent, or Firm*—Schwegman, Lundberg, & Woessner P.A.

(57) ABSTRACT

In time-resolved contrast-enhanced magnetic resonance angiography, a measure quantifying image quality provides a basis for generating a linear filtered composite image by facilitating selection of a mask and an arterial phase image for subtraction. Filtering of individual pixels of a temporal series of images provides enhanced contrast in a single image by allowing the temporal behavior of the pixel intensity to denote representation as an artery, vein or background tissue. Motion artifacts are suppressed by re-registering sequential images, adjusting weighting before averaging and subtraction and filtering the Fourier data to eliminate data corrupted by motion or other phenomena.

5 Claims, 4 Drawing Sheets

U.S. PATENT DOCUMENTS

| | | | | |
|---|---|---|---|---|
| 6,745,066 | B1* | 6/2004 | Lin et al. | 600/425 |
| 6,909,796 | B2* | 6/2005 | Pomata et al. | 382/131 |
| 6,983,182 | B2* | 1/2006 | Mistretta | 600/425 |
| 7,020,314 | B1 | 3/2006 | Suri et al. | |
| 7,020,318 | B2 | 3/2006 | Oshio et al. | |
| 7,545,967 | B1* | 6/2009 | Prince et al. | 382/130 |

OTHER PUBLICATIONS

"U.S. Appl. No. 10/664,425 Final Office Action mailed Jul. 7, 2008", FOAR, 9 pgs.

"U.S. Appl. No. 10/664,425, Non-Final Office Action mailed Dec. 21, 2007", OARN, 3 pgs.

"U.S. Appl. No. 10/664,425, Supplemental Response filed Apr. 15, 2008 to Office Action mailed Dec. 21, 2007", 7.

"U.S. Appl. No. 10/664,425, Notice of Allowance mailed Feb. 2, 2009", 3 pgs.

"Restriction Requirement mailed Aug. 16, 2007 in U.S. Appl. No. 10/664,425", RERR, 2 pgs.

Blasbalg, R., et al., "Free MRA of the abdomen: postprocessing dynamic gadolinium-enhanced 3D axial MR images", *Abdominal Imaging*, 25(1), (2000), 62-66.

Bock, Michael, et al., "Separation of Arteries and Veins in 3D MR Angiography Using Correlation Analysis", *Magnetic Resonance in Medicine*, 43(3), (2000), 481-487.

Ehman, Richard L, et al., "Adaptive Technique for High-Definition MR Imaging of Moving Structures", *Radiology*, 173(1), (1989), 255-263.

Fraser, D. G.W, et al., "Deep Venous Thrombosis: Diagnosis by Using Venous Enhanced Subtracted Peak Arterial MR Venography versus Conventional Venography", *Diagnosis of Deep Venous Thrombosis with MR Venography*; vol. 226(3), (Mar. 2003),812-820.

Goyen, Mathias, et al., "Pulmonary Arteriovenous Malformation: Characterization With Time-Resolved Ultrafast 3D MR Angiography", *Journal of Magnetic Resonance Imaging*,13, (2001), 458-460.

Hennig, Jurgen, et al., "Time-Resolved Projection Angiography after Bolus Injection of Contrast Agent", *Magnetic Resonance in Medicine*, 37, (1997), 341-345.

Kaandorp, Dave W, et al., "Venous Signal Suppression in 3D Dynamic Gd-Enhanced Carotid Artery Imaging Using the Eigenimage Filter", *Magnetic Resonance in Medicine*, 42, (1999), 307-313.

Khilnani, Neil M, et al., "Peripheral Vascular Disease: Combined 3D Bolus Chase and Dynamic 2D MR Angiography Compared with X-ray Angiography for Treatment Planning", *Radiology*, 224(1), (2002), 63-74.

Klisch, J., et al., "Time-resolved projection MRA: clinical application in intracranial vascular malformations", *Neuroradiology*, 42, (2000), 104-107.

Korosec, Frank R, et al., "Time-Resolved Contrast-Enhanced 3D MR Angiography", *Magnetic Resonance in Medicine*, 36(3), (1996), 345-351.

Kruger, Robert A, et al., "A method for time domain filtering using computerized fluoroscopy", *Medical Physics*, 8(4), (1981), 466-470.

Kruger, Robert A, et al., "Digital Subtraction Angiography", *Chapter 9*, G.K. Hall Medical Publishers, Boston, MA, (1984), 197-219.

Ludman, C. N, et al., "Feasibility of Using Dynamic Contrast-enhanced Magnetic Resonance Angiography as the Sole Imaging Modality Prior to Endovascular Repair of Abdominal Aortic Aneurysms", *Eur. J. Vasc. Endovasc. Surg.*, 19, (2000), 524-530.

Mistretta, Charles A, et al., "3D Time-Resolved Contrast-Enhanced MR DSA: Advantages and Tradeoffs", *Magnetic Resonance in Medicine*, 40(4), (1998), 571-581.

Prince, M. R, et al., "Mask Averaging to Improve 2D Projection MRA of Peripheral Arteries", *XIII Annual International Workshop on MRA*, Madison, WI, (2001), p. 84.

Prince, Martin R, et al., "3D Contrast MR Angiography", Springer-Verlag, New York, 2nd Edition, (1998).

Schoenberg, Stefan O, et al., "Abdominal Aortic Aneurysm: Detection of Multilevel Vascular Pathology by Time-Resolved Multiphase 3D Gadolinium MR Angiography: Initial Report", *Investigative Radiology*, 34(10), (1999), 648-659.

Strecker, R., et al., "Fast Functional MRA Using Time-Resolved Projection MR Angiography With Correlation Analysis", *Magnetic Resonance in Medicine*, 43(2), (2000), 303-309.

Takano, K., et al., "Dynamic contrast-enhanced subtraction MR angiography in intracranial vascular abnormalities", *Eur. Radiol.*, 9, (1999), 1909-1912.

Turski, Patrick A, et al., "Contrast-Enhanced Magnetic Resonance Angiography of the Carotid Bifurcation Using the Time-Resolved Imaging of Contrast Kinetics (TRICKS) Technique", *Topics in Magnetic Resonance Imaging*, 12(3), (2001), 175-181.

Wang, Yi, et al., "Contrast-Enhanced Peripheral MR Angiography from the Abdominal Aorta to the Pedal Arteries: Combined Dynamic Two-Dimensional and Bolus-Chase Three-Dimensional Acquisitions", *Investigative Radiology*, 36(3), (2001), 170-177.

Wang, Yi, et al., "Dynamic MR Digital Subtraction Angiography Using Contrast Enhancement, Fast Data Acquisition, and Complex Subtraction", *Magnetic Resonance in Medicine*, 36(4), (1996), 551-556.

Wang, Yi, et al., "Generalized Matched Filtering for Time-Resolved MR Angiography of Pulsatile Flow", *Magnetic Resonance in Medicine*, 30, (1993), 600-608.

Winchester, Priscilla A, et al., "Comparison of Two-dimensional MR Digital Subtraction Angiography of the Lower Extremity with X-Ray Angiography1", *Journal of Vascular and Interventional Radiology*, 9(6), Discussion 900, (1998), 891-899.

Yoo, Stanley K, et al., "Postprocessing Techniques for Time-resolved Contrast-enhanced MR Angiography", *Radiology*, 222(2), (2002), 564-568.

Zar, J. H, "Biostatistical Analysis", *Chapters 8 and 9*, 3rd Edition, Prentice Hall, Upper Saddle River, NJ, (1996), 123-178.

\* cited by examiner

SYSTEM AND METHOD FOR GENERATING COMPOSITE SUBSTRACTION IMAGES FOR MAGNETIC RESONANCE IMAGING

RELATED APPLICATIONS

This application is a divisional of U.S. patent application Ser. No. 10/664,425, filed Sep. 17, 2003, which is going to issue as a patent on Jun. 9, 2009 under U.S. Pat. No. 7,545,967, which document claims the benefit of U.S. Provisional Application Ser. No. 60/412,032, filed Sep. 18, 2002, the specifications of which are incorporated by reference.

GOVERNMENT FUNDING

The subject matter described in this application was made with funds from the National Institutes of Health, Grant Number R01 HL60879. The United States Government has certain rights in the invention.

TECHNICAL FIELD

This document relates to image processing, and more particularly, to generating subtraction images based on magnetic resonance imaging.

BACKGROUND

Current medical imaging systems are unable to provide sufficient image quality. For example, images often lack sufficient contrast or resolution to permit an analyst, such as a radiologist or surgeon to reliably identify small features. In addition, the signal to noise ratio may impair the image quality.

Traditional angiography subtraction methods, for example, using a contrast agent, suffer from increased noise and an inability to generate an individual, high quality image. In addition, some subtraction techniques require human interaction and judgement as to image quality. Artifacts, such as those resulting from motion, electronic glitches, spikes and other transients, can also impair image quality.

SUMMARY

In one embodiment, a plurality of images acquired prior to the arrival of a bolus infusion of a contrast agent in a region of interest are averaged together to obtain a mask for complex subtraction. In one embodiment, a plurality of arterial phase images are averaged. In one embodiment, a filter based on arterial characterization is used for selecting phase images and mask images to generate a summary arteriogram.

In one embodiment, a method includes generating a plurality of pairs of images, generating a selected pair from the plurality of pairs of images, the selected pair having a selected pair quality value such that each unselected pair of the plurality of pairs of images has a quality value less than or equal to the selected pair quality value, and for the selected pair including a first image and a second image, substituting alternative first images to improve the quality score and then substituting alternative second images to improve the quality score and repeating until convergence.

In one embodiment, the present subject matter includes a method for creating a composite subtraction image from a patient using magnetic resonance imaging and an administered magnetic resonance contrast agent. The method includes generating a set of input images where each input image includes a plurality of pixels. Each pixel is represented by a complex number. At a time during the imaging, a contrast agent is introduced into the patient. The method also includes selecting a single post-contrast image to be called the arterial phase image and selecting a subset of images (containing at least two images) to be called the mask images. The method includes calculating the average of the set of mask images by using complex arithmetic to add up the complex numbers and then dividing by the number of mask images. The method includes subtracting this average of the set of mask images from the arterial image, also using complex arithmetic, to produce a composite subtraction image.

In one embodiment, the magnitude of each pixel of the resulting composite image is computed and the resulting image is then displayed on a computer monitor, stored in memory or printed. In one embodiment, the arterial image, rather than being selected, is calculated as the average of a set of selected arterial images. The average is computed using complex arithmetic where the complex numbers are summed and then divided by the number of selected arterial images. In one embodiment, the set of mask images contains all pre-contrast images.

In one embodiment, the selection of the set of mask images, or the selection of the set of arterial images, is done manually or with the assistance of a computer program. In one embodiment, both the selection of the set of mask images and the selection of the set of arterial images is done manually or with the assistance of a computer program.

In one embodiment, a computer program is used to display a set of thumbnail images. Each thumbnail images is computed by complex subtraction of the input images from some fixed mask image followed by computing the magnitude. In one embodiment, the selected thumbnail images included in the set of mask images, or included in the set of arterial images, are indicated by their display. In one embodiment, those thumbnail images not included in either set of images are indicated by their display. In one embodiment the thumbnail images are displayed without subtraction to assist in identifying those images degraded by motion or other artifact.

In one embodiment, the computer program displays an active composite image based on the current set of mask images and the current set of arterial images. In one embodiment, the set of mask images or the set of arterial images is alterable by the action of the user. In one embodiment, the active composite image is automatically updated as the set of mask images or the set of arterial images is altered. In one embodiment the computer program displays both a first composite image which is unchanged and a second composite image which has been updated based on the user selected images for addition or subtraction. Displaying both composite images may assist the user in recognizing improvements.

In one embodiment, the thumbnails are computed using subtraction of magnitude images. In one embodiment, the thumbnails are computed using a user-selectable mask image. In one embodiment, the thumbnails are computed using an automatically selected mask image. In one embodiment, the thumbnails and/or composite image can be zoomed in on, or have their brightness or contrast altered, by the user. In one embodiment, the computer program automatically selects a set of mask images or a set of arterial images.

In one embodiment, a set of mask images includes both pre contrast images and images following the arterial phase of the bolus so as to subtract both the background tissue and the background tissue enhancement.

In one embodiment, the present subject matter includes a method for determining the quality of a composite image. In one embodiment, the quality of the composite image is calculated as the difference in average intensity between the pixels labeled as foreground and the pixels labeled as background. Pixels are labeled as foreground when their intensities lie in a top percentile of their row and pixels are labeled as background when their intensities lie in a bottom percentile of their row. In one embodiment, a computer displays a quality score of a composite image and updates the quality score in real time as the composite image is modified.

In one embodiment, several of the top or bottom rows of the image are excluded from consideration for the quality score. In one embodiment, the quality score is divided into left and right halves and the quality scores are computed independently in each half and then summed to determine the overall quality score. In one embodiment, the quality score is computed only on a subset of the rows. In one embodiment, the quality score is computed only on a user-selected subset of the image.

In one embodiment, the present subject matter includes a method for selecting a set of mask images and a set of arterial images. In one embodiment, the method includes searching for the set of mask image and the set of arterial images such that the composite image, consisting of the magnitude of the complex difference between the complex average of the set of mask images and the complex average of the set of arterial images, satisfies a predetermined criteria. In one embodiment, the predetermined criteria is to maximize a quality function. In one embodiment, the search proceeds by first determining the image during which the contrast agent arrives. In one embodiment, the arrival of the contrast agent is determined by the first large increase in the quality score of the temporal sequence of composite images generated by subtraction of a pre-contrast mask (or masks) from all images acquired after that mask (or masks).

In one embodiment, the quality score is computed excluding a user-selected subset of the image.

Other aspects of the invention will be apparent on reading the following detailed description of the invention and viewing the drawings that form a part thereof.

BRIEF DESCRIPTION OF THE DRAWINGS

In the drawings, like numerals describe substantially similar components throughout the several views. Like numerals having different letter suffixes represent different instances of substantially similar components.

DETAILED DESCRIPTION

In the following detailed description, reference is made to the accompanying drawings that form a part hereof, and in which is shown, by way of illustration, specific embodiments in which the present subject matter may be practiced. These embodiments are described in sufficient detail to enable those skilled in the art to practice the subject matter, and it is to be understood that the embodiments may be combined, or that other embodiments may be utilized and that structural, mechanical, logical and electrical changes may be made without departing from the scope of the present subject matter. The following detailed description is, therefore, not to be taken in a limiting sense, and the scope of the present subject matter is defined by the appended claims and their equivalents.

In one embodiment, a method includes generating an image of a body part (such as an artery) based on a series of images acquired prior to injecting a contrast agent and a series of images acquired after injection of the contrast agent. The contrast agent, in one embodiment, includes gadolinium. The composite image is obtained by selecting a pre-contrast image as a subtrahend, or mask image, and selecting a post-contrast, or arterial phase image as the minuend. The difference between the subtrahend and the minuend is calculated in Fourier space or in image space such as by complex vector subtraction that includes both phase and magnitude information of the magnetic resonance signal.

In one embodiment, multiple acquired images are selected and averaged together to maximize arterial information and to minimize background noise. For example, in a particular imaging session, large amounts of pre-contrast agent image data and post-contrast agent data is rapidly collected. The data may include multiple arterial images showing the contrast bolus passing through the arteries.

In one embodiment, the arterial image quality can be improved by subtracting an average of multiple masks from the arterial images. In one embodiment, the subtraction is performed on the complex-valued images and the magnitude of the resulting quantities is stored or displayed. Each pixel of a magnetic resonance image contains a complex value having both a real and imaginary part. In one embodiment, subtraction includes calculating a difference of complex numbers having a real part and an imaginary part. In one embodiment, subtraction includes calculating a difference of real numbers.

In one embodiment, multiple arterial phase images are averaged to derive a composite arterial phase image for use as a minuend and multiple mask images are averaged to derive a composite mask for use as a subtrahend. In one embodiment, the images are re-registered to correct for motion or other artifacts before averaging. In one embodiment, degraded or corrupted portions of the Fourier image data is omitted or eliminated prior to averaging. Degraded or corrupted portions of the Fourier image data may be caused by motion or other artifacts. In one embodiment, motion degraded Fourier data is at least partially corrected by filtering to eliminate data outside the expected bounds.

In one embodiment, a processor or computer is used to detect the arrival of a contrast agent and thus select mask images and arterial phase images. In one embodiment, the temporal behavior of corresponding pixels of a series of images is examined to identify those pixels associated with arterial phase enhancement. For example, those pixels that remain relatively unchanged over time are associated with background data whereas those pixels that exhibit an increase in intensity over time are associated with arrival of a contrast agent, and thus, an artery. In one embodiment, a standard deviation is calculated for each pixel to suppress background data and enhance arterial data.

In one embodiment, a user or operator provides data to a processor identifying a location in an image corresponding to an artery and a location in an image corresponding to background data. The processor of the present subject matter then selects other pixels with a temporal enhancement profile similar to the identified locations and categorizes those selected pixels as arteries or background. In one embodiment, the user provides data to a processor to identify background tissue which facilitates re-registration of images corrupted by motion artifacts.

In one embodiment, motion corrupted images are corrected by first aligning the interface between air and tissue on arterial phase images prior to averaging. Motions include those that are voluntary as well as those that are involuntary such as tremor, respiration, peristalsis or the like.

In one embodiment motion artifacts are reduced by identifying motion corrupted lines of k-space data and removing them prior to averaging and subtracting. Motion may by voluntary or involuntary and may be caused by a tremor, respiration, peristalsis or the like.

In one embodiment, a method includes excluding k-space data that is corrupted or degraded by other phenomena, such as electrical noise, electrical spikes, coil vibration, data corruption or other factors.

One method relates to performing image subtraction where there is an improved signal-to-noise ratio, and where a series of images of the artery can be consolidated into a single image that exhibits higher quality than the individual images. A higher quality image exhibits a higher signal-to-noise-ratio and a higher contrast ratio than a lower quality image.

Improvement in the signal-to-noise ratio is obtained, in one embodiment, by averaging a plurality of masks and subtracting the average mask from a pre-contrast image. In one embodiment, a plurality of mask images, each of which do not include motion, are averaged into a single mask. Such a mask has a high signal value and low noise value, so when that single mask is used for subtraction, it introduces less noise into the final image, and it therefore increases the signal-to-noise ratio of the final, or composite, image.

In one embodiment, to select a particular mask image, a particular arterial image is subtracted from each of a series of candidate mask images. A measure of quality is calculated for each resulting difference image. Those candidate mask images in the series of images associated with a difference image having a quality in excess of a predetermined threshold are then selected. The selected candidate mask images are then averaged to yield the particular mask image.

In one embodiment, a method includes calculating an average of a plurality of artery images where each artery image includes an artery. The method also includes subtracting an average mask image from the average of the plurality of artery images.

For example, a first arterial image may show the gadolinium (or contrast agent) just beginning to enter the artery and subsequent images show the gadolinium moving along and finally leaving the artery. However, when those images are averaged, a composite image is generated which shows an entire artery from top to bottom, with a higher signal-to-noise ratio and higher clarity than any one individual image.

A variety of filtering methods are suitable for use with the present subject matter. In one embodiment, a standard deviation filter is applied to the series of images. Pixels in an image associated with an artery have a large standard deviation and those pixels associated with the background have a low standard deviation. In one embodiment, images corrupted by motion are identified and weighted less heavily than images not corrupted by motion.

One embodiment includes a method for automatic selection of masks and arterial images. The method includes identifying a threshold image in a series of images. The threshold image is the first image in the series that exhibits a contrast agent.

In one embodiment, the threshold image is identified by a voting method. An exemplary voting method includes identifying images in which a substantial variation in pixel intensity occurs in a particular line, or row, of pixels. A substantial variation denotes arrival of a contrast agent. Those images corresponding to a time prior to the arrival of the contrast agent are used as masks and those images that following the threshold image are the images that show an artery.

In one embodiment, a voting method is applied to images in which there has already been subtraction of a pre-contrast mask image. In one embodiment, the images are re-registered to eliminate pixel variation occurring from a subtraction artifact.

In one embodiment, a method includes selecting a particular single mask and arterial image pair. The particular single mask and arterial image pair, according to one embodiment, have the highest quality measure. A quality measure, according to one embodiment, is calculated by a quality function that yields a high value for bright artery pixels and dark background pixels. To identify a particular pair, generate a quality measure for each single mask and arterial image pair and identify the particular pair that has the highest quality measure.

In one embodiment, a method includes initializing M and A with M being a particular mask image and A being a particular arterial image as determined above.

Next, image A is updated by adding other arterial images that increase the quality measure relative to the current image A. If the quality measure increases, then the additional image is retained and if the quality measure does not increase, then the additional image is discarded. Next, image M is updated by adding other mask image values that increase the quality measure when using the current A. The method continues by repeatedly updating image A followed by updating of image M until convergence. Convergence is achieved when the quality measure no longer increases or the increases are sufficiently small or after some fixed amount of time has elapsed.

In one embodiment, the automatic selection of mask and arterial images may be performed on a particular region of interest. For example, if the both legs are included in the image, a region of interest containing only one leg may be selected. Alternatively, a region that appears diseased may be selected to obtain maximum quality in this diseased region.

In one embodiment, a region that is corrupted by motion may be selected for exclusion by the optimizing scheme. Alternatively, a region known to not include arteries can be selected, to be so designated by the optimization scheme.

Figure 1:
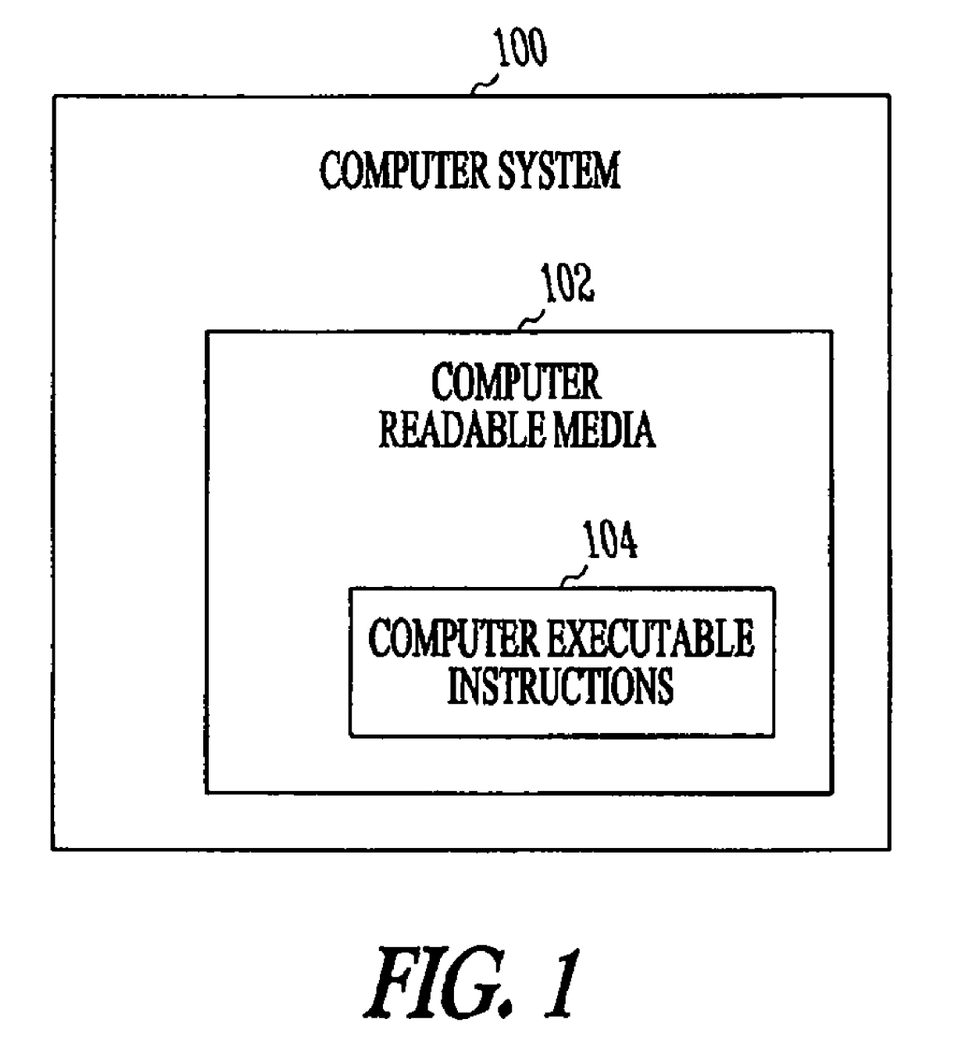
FIG. 1 is an illustration of a computer system including computer-readable media in accordance with one embodiment of the present subject matter.

FIG. 1 includes an illustration of computer system 100 including computer-readable media 102 in accordance with one embodiment of the subject matter. Computer system 100 is not limited to a particular computer system. Any computer system that includes computer-readable media 102 is suitable for use in connection with the present subject matter. The computer-readable media can exist internal or external to computer system 100 and computer-readable media 102 can be directly (on a bus, not shown) or indirectly (through a network, also not shown) coupled to a processor (not shown) included in computer system 100. Computer-readable media 102 is not limited to a particular type of computer-readable media. Exemplary computer-readable media suitable for use in connection with the present subject matter include sold-state memory and magnetic memory. Embodiments of methods described herein can be implemented as computer executable instructions 104 and stored on computer-readable media 102. Computer system 100, in various embodiments, includes at least one of any combination of a keyboard, a mouse, a trackball, a touchscreen, a pointing device or other input device. Computer system 100, in various embodiments, includes at least one of any combination of a printer and a monitor. In various embodiments, images from a magnetic resonance image generator are supplied to computer system 100 by, for example, a wired connection, a wireless connection or by removable memory media.

In one embodiment, a user interface is provided to facilitate allowing an observer to select mask and arterial images. The interface includes a display for simultaneously presenting thumbnail-sized images of all, or selected, images of the time sequence of images. The thumbnail images can be simultaneously subtracted by a single image or a combination of images, where the image or combination of images is selected manually (by user input) or automatically. The subtraction operation, in various embodiments, includes a pre-contrast image, a post-contrast image, an image concurrent with arrival of the contrast agent or a combination of images. Individual thumbnail images can be selected for subtraction (generally, but not exclusively, done using pre-contrast images) or for addition (generally, but not exclusively, done using arterial images) by clicking with a particular button of a mouse or other user operable input device. In one embodiment, the selected images are highlighted, or distinguished, in some manner, from those thumbnail images that are not selected. In one embodiment, the selected images are highlighted or distinguished in some manner to indicate whether they are selected as mask images or arterial images. In one embodiment, a colored border appears around a selected image when selected. In one embodiment, a colored border appears blue to denote a mask image and green or red, for example, to denote an arterial image. Other means, characters, or flags are contemplated for highlighting selected images. For example, in one embodiment, a distinctive display beneath the image or animation is used to denote a selected image.

In one embodiment, as images are selected for addition or subtraction, the final composite image is displayed. This composite image includes the average of the images selected for subtraction, subtracted from the average of the images selected for addition. The composite image is calculated upon selection of each additional image for addition or subtraction. By displaying the changes in the composite image in substantially real time relative to each selection by the user, the effect on the composite image quality is readily apparent to the user.

Figure 2:
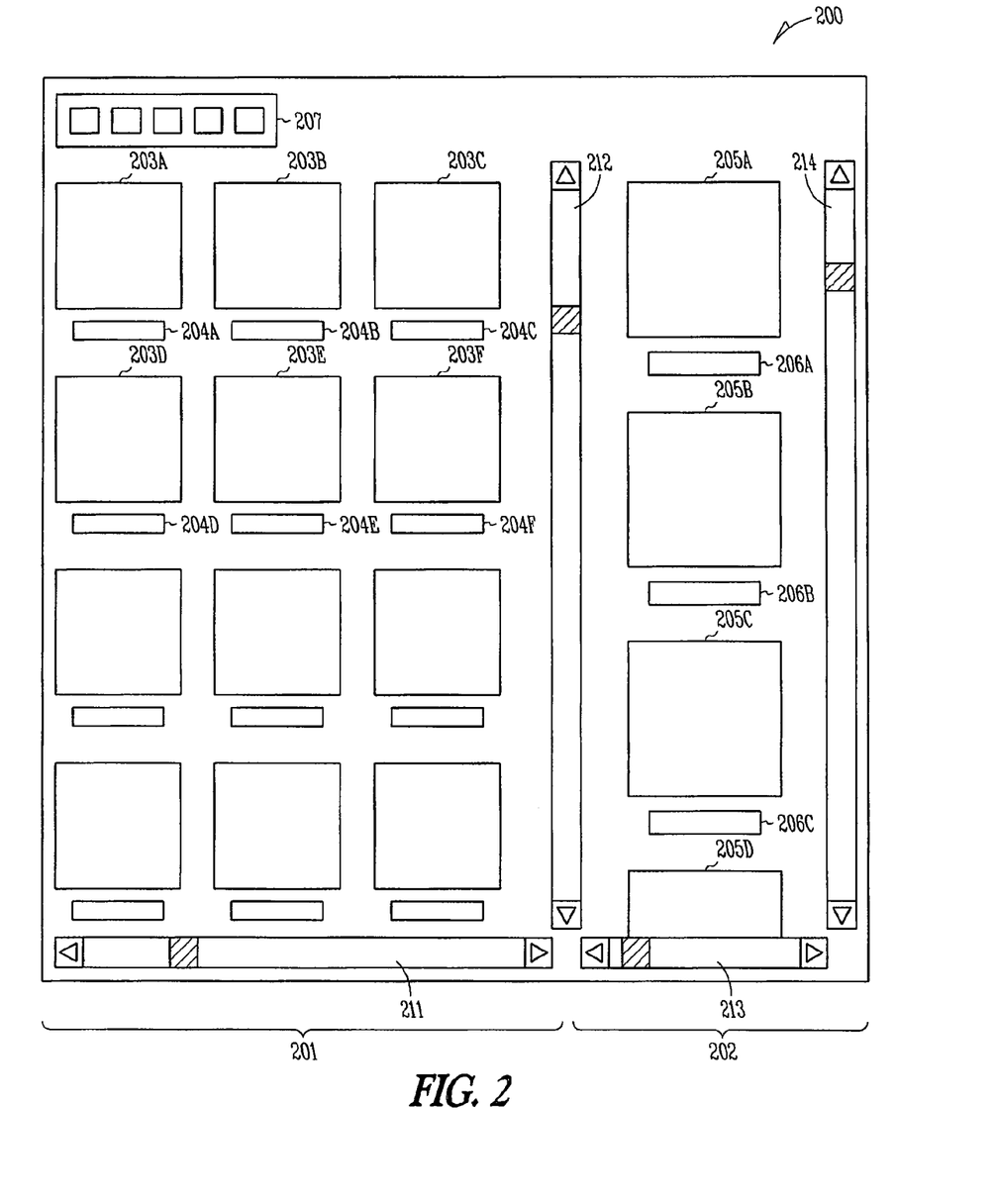
FIG. 2 illustrates an image-selection user interface according to one embodiment of the present subject matter.

One embodiment of the user interface is illustrated in FIG. 2. Main window 200 includes pane 201 and pane 202. Each of panes 201 and 202 can be scrolled independently on horizontal and vertical axis with pane 201 scrolled using scroll bar 212 and 211 and pane 202 scrolled using scroll bar 214 and 213. Pane 201 displays a two-dimensional table having, as elements, thumbnail images 203A, 203B, 203C and others. Thumbnail image 203A, in one embodiment, is generated by subtraction using a fixed mask. In one embodiment, a default image is selected, such as, for example, image 203C. The default image can be altered. Upon user selection (by, for example, clicking on a button in toolbar 207), a different fixed mask can be selected and each displayed thumbnail image is thereafter updated and displayed.

In one embodiment, thumbnail image 203 includes textual information. The textual information may be displayed above a thumbnail image, beneath a thumbnail (as shown at area 204A for thumbnail image 203A), or between the rows of images. Thumbnail images 203 appear in row-major order according to the time of acquisition with the first image (image 203A) acquired appearing in the upper left corner and a last image acquired appearing in the lower right corner. Particular thumbnail images in the table are selected as mask images or as arterial images. In various embodiments, the selection is made by a processor executing a program, manually by a user or in a combined manner as described elsewhere herein. In one embodiment, selected thumbnail images are distinguished by the presence of a first colored border for arterial images and second colored border for mask images. In one embodiment, the first color is green and the second color is blue. A particular thumbnail image 203 is selected or unselected by clicking a mouse button. The particular mouse button clicked determines status of the image as a mask image or as an arterial image. Clicking on a selected thumbnail image will cause the image to be unselected.

Pane 202 includes one or more composite images 205 generated based on the selected images in pane 201. An active composite image is illustrated at image 205A and is the result of averaging the images currently selected as arterial images, and then subtracting the average of the images currently selected as mask images. Whenever the set of selected images (in pane 201) is altered, active composite image 205A is updated in real-time. Various information regarding the composite image is displayed immediately below the image at 206A and similar information is displayed immediately below other composite images 205B, 205C and 205D in area 206B, 206C and 206D of pane 202.

When a particular button on the toolbar 207 is pushed, images are automatically selected as described herein and the active composite image 205A is updated. Following updating of active composite image 205A, the set of selected images can be manually altered by clicking on different images and selected toolbar buttons of toolbar 207.

Pane 202 illustrates a stack of saved images with the images ordered from top to bottom according to how recently they were saved. When a particular button on the toolbar 207 is pushed, the active composite image 205A is saved. The next most recently saved image is displayed at image 205B, the second most recent image at 205C, and pane 202 can scroll vertically using scroll bar 214 if enough images have been saved.

In various embodiments, image processing operations can be applied to the thumbnail images in pane 201 and the composite images in 202. For example, in one embodiment, the contrast of all images can be altered, either manually or automatically, in order to make various details more easily visible. In one embodiment, the user can zoom in, or change the magnification, on the thumbnail images or the composite image. In one embodiment, the mouse can be used to select a region of interest within the composite image such that the automatic mask selection algorithm explicitly prioritizes (or ignores) the composite quality in this region.

In one embodiment, a particular mask image is chosen for subtraction by first selecting at least one or more particular arterial images. The selected arterial phase image (or images) is then subtracted from all the other thumbnail images. Pre-contrast images which yield the best subtractions are then selected. This allows the operator to rapidly find a particular mask image for subtraction.

In one embodiment, a quality measure is calculated for each composite image and is displayed near each image. The quality measure, in one embodiment, is calculated based upon a variety of quality functions. In one embodiment, the present subject matter allows a user to select a particular quality function or parameters for use in calculating quality measure. In one embodiment, a quality measure is calculated for the entire composite image. In one embodiment, a quality measure is calculated for a selected region of interest within an image where the region is user-selectable. In one embodiment, a portion of the image can be magnified or minimized.

In one embodiment, and as a default, the composite image is displayed in its entirety at the acquired resolution.

In one embodiment, a processor executes a program to automatically select an optimum mask and arterial image that maximizes a quality function selected by the operator. The optimum mask and arterial images are displayed and made available for further editing or adjustment by the user. For example, in one embodiment, a quality measure is displayed near the composite image to aid the user in the selection of additional images or de-selection of images. In one embodiment, a selected region of interest in a composite image can by optimized automatically by the processor.

Figure 3:
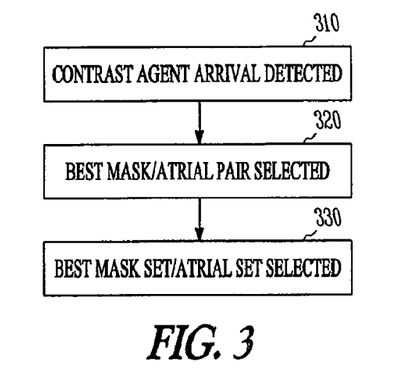
FIG. 3 illustrates a flow chart of a method according to one embodiment of the present subject matter.

FIG. 3 illustrates method 300 according to one embodiment of the present subject matter of automatic selection of the mask and arterial phase images for temporally-resolved magnetic resonance digital subtraction angiography. In the figure, at 310, the arrival of the contrast agent is detected. Various methods can be used to detect arrival, including monitoring changes in standard deviation of pixels in a particular row of pixels in an image. In one embodiment, the subtraction image quality is evaluated as a function of time to determine arrival time. At 320, the method includes identifying a pair of images having the best mask image and a best atrial phase image. As a consequence of the selection at 320, the method also includes selecting, at 330, the best mask set and the best atrial phase set. The best images and sets as described herein are based on evaluations of a predetermined quality function.

In one embodiment, the present subject matter provides for subtraction of at least one delayed equilibrium phase images. This can be useful to remove background tissue, which might otherwise be included in a calculation of the composite image along with late arterial images.

In one embodiment, the composite images can be selectively saved to memory. In one embodiment, multiple composite images are displayed simultaneously to facilitate visual grading. Composite images can be saved as DICOM for export to standard diagnostic imaging equipment. Images may be saved with annotations. In one embodiment, saved data or annotations is included to identify the data utilized in creating the image.

In one embodiment, motion correction is provided. For example, in one embodiment, a processor of the present subject matter executes a program to allow an image to be adjusted, shifted or moved to re-register its location relative to another image. In one embodiment, a motion corrupted image can be discarded or excluded from a calculation. In one embodiment, correction of other artifacts is provided. For example, in one embodiment, a processor of the present subject matter executes a program to display Fourier data and subtractions of Fourier data which allows the user to identify and eliminate degraded or corrupted portions of Fourier data. In particular, portions of Fourier data degraded by motion, electronic noise or spikes, coil artifacts, or computer error may be eliminated prior to averaging.

In one embodiment, a program executing on a processor of the present subject matter allows for the creation of a video sequence, or movie, showing successive arterial images individually optimized by selection of optimum mask image(s) for subtraction.

The present subject matter is applicable to both 2D and 3D time-resolved magnetic resonance angiography data generated by various methods including, but not limited to, spiral k-space acquisition, projection acquisitions, vastly under sampled isotropic projection imaging (VIPR), time resolved imaging of contrast kinetics (TRICKS), FLIPER and periodically rotated overlapping parallel lines with enhanced reconstruction (PROPELLER) methods. In data acquisition methods where each, or most, data acquisition line, spiral or other trajectory through k-space includes data from the center of k-space there is the opportunity to apply sliding window reconstruction techniques to improve temporal resolution. Each trajectory of data acquired that includes the center of k-space can be used in combination with multiple other lines of k-space data to create one image in a time-resolved series of images. The temporal resolution can then be as high as the time to repeat pulses (TR). In one embodiment, the mask data for subtraction is averaged. The mask data for subtraction, in various embodiments, includes all or some of the arterial phase data. The sliding window approach offers opportunities to eliminate spurious lines of data corrupted by motion, or other artifact, if that data represents too great a change from the preceding and following data.

In one embodiment, a filtering algorithm is applied to the data acquisition to eliminate data which is outside the threshold of expected changes that can occur with arrival of the contrast agent. For example, motion or electronic spikes may produce large changes in k-space coefficients at one point of data acquisition which can be eliminated by a thresholding algorithm. In one embodiment, consistency requirements for both the phase and magnitude data are applied. For example, in one embodiment, linear phase shifts which correspond to motion are filtered out.

EXAMPLE 1

In one example of the present subject matter, post processing techniques are used for time-resolved contrast-enhanced magnetic resonance angiography. This example describes two-dimensional projection magnetic resonance digital subtraction angiography using re-masking and filtering post processing techniques.

A bolus-chase examination was supplemented with preliminary two-dimensional (2D) magnetic resonance digital subtraction angiography of the trifurcation and feet. A quantity of 5-7 mL of gadolinium-based contrast material was used.

Bolus timing information from 2D magnetic resonance digital subtraction angiography is helpful in planning the subsequent three-dimensional bolus chase examination.

Projection magnetic resonance angiography of the trifurcation provided a single anteroposterior view and was performed repeatedly at 1-2-second intervals to help evaluate the time course and symmetry of vascular enhancement.

At least one projection image was acquired prior to the arrival of the contrast material and used as a mask for subtraction of the background signal.

Because magnetic resonance data are complex (vector), unlike radiographic data, which are real numbers, the post processing techniques are generalized to the complex domain.

In this example, 2D time-resolved data was obtained at 1.5 T by using the head coil for signal transmission and reception (LX Horizon; GE Medical Systems, Milwaukee, Wis.). The patients were placed feet first into the magnet, with their legs positioned within the head coil to image from above the patella down to the middle of the calf. A sagittal gradient echo scout sequence was used to position the coronal 2D projection magnetic resonance angiographic slab so that it encompassed the entire calf. Two-dimensional projection magnetic resonance angiography was performed as a coronal spoiled gradient-echo sequence using the following parameters: 10/2

(repetition time msec/echo time msec); flip angle, 60°; slab thickness, 7-10 cm; field of view, 30 cm; matrix, 256×192; and bandwidth, 16 kHz.

An imaging time of 1.95 seconds per acquisition was used for a total of 68 seconds to repeat the acquisition 35 times. Five to seven milliliters of 0.5 mol/L gadolinium-based contrast material (gadopentetate dimeglumine, Magnevist, Berlex Laboratories, Wayne, N.J. or gadodiamide, Omniscan, Nycomed Amersham, Princeton, N.J.) was injected and flushed with 20 mL of saline. The injection rate was about 2-3.5 mL/sec and provided with an automatic injector or by hand. The injection was initiated simultaneously with initiating the imaging. In this way, at least five to 10 mask images were obtained before administration of the contrast material and prior to the arrival in the arterial phase at the trifurcation.

Post processing techniques in the complex domain involved treating the two orthogonal components of MR data separately and equivalently, applying post processing techniques of real numbers to each component, and combining the two processed components.

Re-masking entails identifying a mask closest to the background of the enhanced peak arterial phase image so that motion artifacts are minimized on the subtracted arterial phase images and is done through two iterations of subtraction. First, subtraction by using a default mask (image 5 of the 35 serial images) was performed to identify the peak arterial phase (maximal arterial signal). Then the identified peak arterial phase image was used as a mask, and subtraction was performed again to identify the optimal mask among the images obtained before contrast enhancement (i.e., the one with minimal background).

One filtering technique involves matched filtering, which sums a time series of images into a single image of optimal contrast-to-noise ratio (CNR) with undesired background signal suppressed. The linearly matched filter used an input of signal waveform that characterizes the arterial signal. Such an arterial waveform is not well defined throughout the field of view because of variations in the time the contrast material reaches different arteries, particularly portions of an artery distal to stenosis, small branch arteries, and arteries filled via retrograde flow. In the example, the generalized local matched filter replaced the global arterial waveform with a local arterial curve defined by the pixel value minus its mean.

If the final image is denoted as s, and the time series $S_n$, and its average S, and then the local matched filtered image, in one embodiment, is calculated by taking the standard deviation (SD). The filtered image is referred to as the SD image. In one embodiment, the summation range is limited to exclude images with venous or background enhancement.

On the SD image, all images are used from the first mask image to the last arterial phase image. Artifacts caused by motion that occurred during imaging can be eliminated by manually filtering of a manually selected mask image set (M) and arterial phase that appear to be corrupted by motion image set (A). This was referred to as linear filtering.

In 50 patients, arterial image contrast to noise was improved from 30±12 with a single mask to a mean of 68±25 using linear filtering and 83±42 with standard deviation filtering ($p<<0.01$). In addition, the linear and standard deviation filtering showed greater vascular detail with more branch vessels and were subjectively graded by multiple human readers to have superior vessel visibility.

FIGS. 4 and 5 illustrate image quality improvement according to one embodiment of the present subject matter.

Figure 4A:
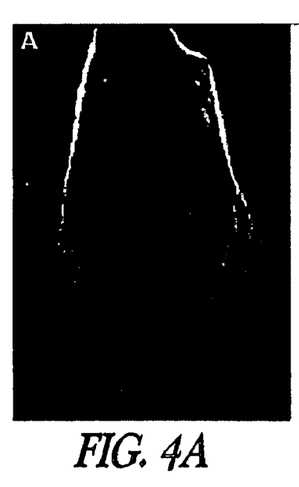
FIGS. 4A, 4B, 4C, 4D, 4E and 4F includes images generated by coronal 2D magnetic resonance imaging digital subtraction angiography obtained in a first subject with claudication.
Figure 4B:
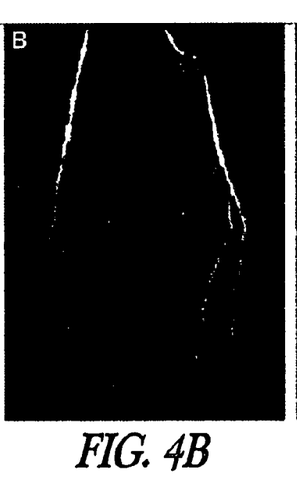
Figure 4C:
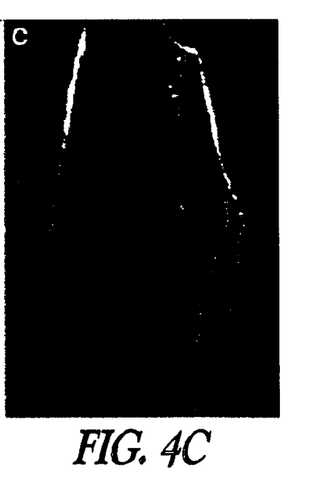
Figure 4D:
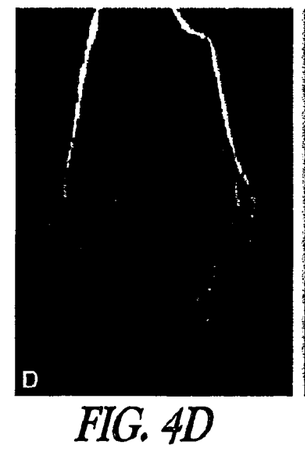
Figure 4E:
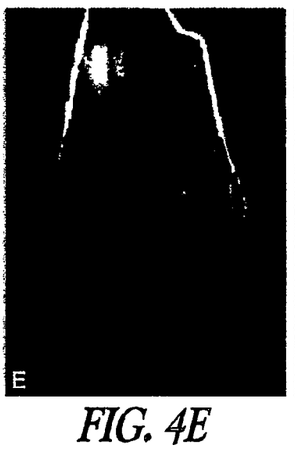
Figure 4F:
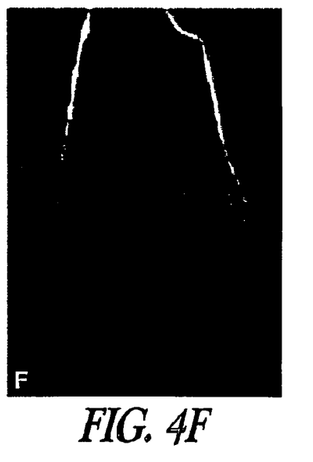
Figure 5A:
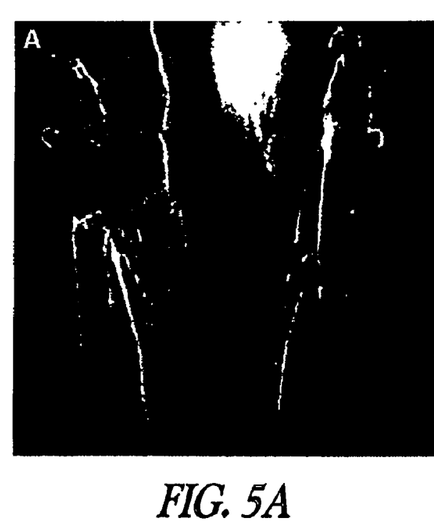
FIGS. 5A, 5B, 5C and 5D includes images generated by coronal 2D magnetic resonance imaging digital subtraction angiography obtained in a second subject with right calf claudication.
Figure 5B:
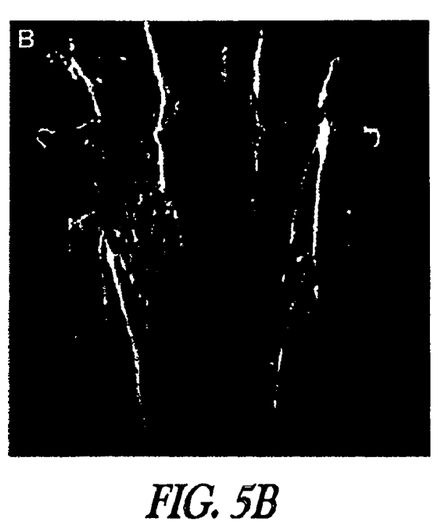
Figure 5C:
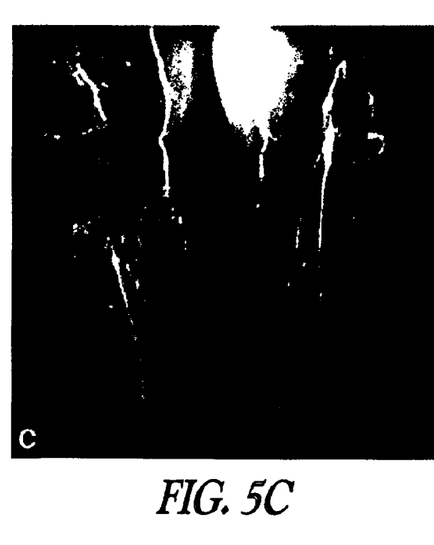
Figure 5D:
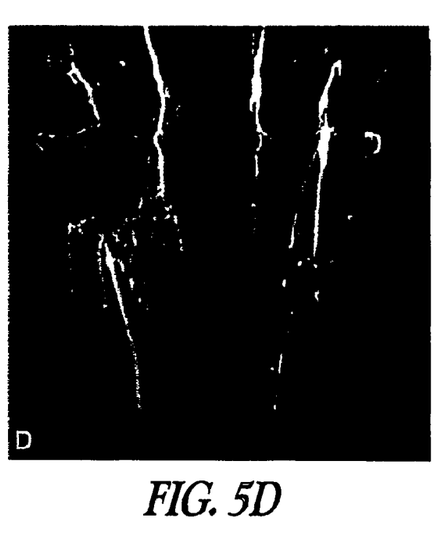

FIGS. 4A, 4B, 4C, 4D, 4E and 4F illustrate coronal 2D magnetic resonance imaging digital subtraction angiography (10/2; flip angle, 60°) images obtained in a 75-year-old man with claudication. FIGS. 4A-4C illustrate contiguous arterial phase images in which the default mask was used. FIG. 4D illustrates peak arterial phase image (corresponding to FIG. 4B) in which an optimized mask was used. FIG. 4E illustrates filtered image with SD from the first mask to the last arterial phase images. FIG. 4F illustrates linearly filtered image in which manually selected masks (five non-enhanced images) and arterial phases (three arterial phases depicted in FIG. 4A-4C) were used. The re-masked image of FIG. 4D demonstrates substantial reduction in background motion artifacts, as compared with that on the default image FIG. 4B. Both the SD image FIG. 4E and the linearly filtered image FIG. 4F demonstrate improved contrast to noise ratio and better vascular details, but the background artifacts are suppressed on the linear image FIG. 4F.

FIGS. 5 illustrate coronal 2D magnetic resonance imaging digital subtraction angiography (10/2; flip angle, 60°) images obtained in a 67-year-old man with right calf claudication. FIG. 5A illustrates arterial phase image in which the default mask was used. FIG. 5B illustrates peak arterial phase image (corresponding to FIG. 5A) in which an optimized mask was used. FIG. 5C illustrates filtered image with SD from the first mask to the last arterial phase images. FIG. 5D illustrates linearly filtered image in which manually selected masks (10 non-enhanced images) and arterial phases (four arterial phases) were used. The motion artifact is substantially suppressed on the re-masked image FIG. 5B and the linearly filtered image FIG. 5D.

EXAMPLE 2

In one example, automatic selection of mask and arterial phase images for temporally-resolved magnetic resonance digital subtraction angiography was used.

An automatic filtering algorithm based on arterial characterization for selecting arterial phase images and mask images was used to generate an optimal summary arteriogram.

Linear filtering was used to select a mask image set and an arterial phase image set to generate a linear filtered image. For a given time series of N images, the mask image set (M) and the arterial phase image set (A), are selected such that quality is optimized for the subtracted or filtered image.

The quality function Q(I) reflects the quality of a given gray image I. The quality function reflects the dual objectives of maximizing foreground brightness and maximizing background darkness.

According to one embodiment, the quality function is calculated as follows:

$$Q(I) = \sum_{y \in [yinit:ystep:yfinal]} \left( \frac{\sum_{p \in ISort([1:MinWidth],y)} I(p)}{MinWidth} - \frac{\sum_{p \in ISort([MaxWidth+1:256],y)} I(p)}{256 - MaxWidth} \right)$$

where ISort([1:256], y) is the sorted array of I([1:256], y) in descending order for each y.

The selection algorithm for the set of mask images and the set of arterial phase images includes following:

1. Detect the contrast arrival time ($N_{ca}$) using a voting method.

2. Select the best single mask and arterial phase image pair of the highest Q(S) from $[1:N_{ca}-1]$, $[N_{ca}-1:N]$.

3. Initialize M and A with the best mask and arterial phase images selected in step 2.

4. Update A by adding other arterial images that increase Q(S) with current M.

5. Update M by adding other mask images that increase Q(S) with current A.

6. Repeat steps 4 & 5 until convergence.

EXAMPLE 3

In one embodiment, the quality function is defined by the difference between the average artery image and the average background (or mask) image where the foreground is bright (artery) and the background (mask) is dark. An artery is relatively thin, vertically oriented and has a width of typically 1-5 mm. To quantify, or define, image quality, certain assumptions are made. First, to discern foreground and background pixels, use the following method:

A) for any given (the yth) horizontal scan line, a particular pixel is in the foreground if the pixel ranks in brightness between 1st and (Minwidth)th of 256 pixels in the scan line; (or between the 1st and 2nd of 128 pixels in the scan line);

B) for any given (the yth) horizontal scan line, a particular pixel is in the background if the pixel ranks in brightness between (Maxwidth+1)th and 256 pixels in the scan line; (or between the 11th and 128th pixel in the scan line) and C) if the pixel ranks in between these points, then the classification is uncertain.

The vertical artery line width, w, is defined as being in the range of Minwidth<w<Maxwidth.

Image quality evaluation, in one embodiment, is simplified by any combination of at least one of:

1) splitting the image on a vertical axis into left and right halves and assess image quality separately for each half;

2) evaluating image quality for every 4th or 8th horizontal scan line; and 3) assigning a top and bottom margin (2-3 cm). This omits non-linear effects such as coil drop-off, gradient warping and field inhomogeneity In one embodiment, the mask image (M) and arterial phase image (A) are selected to maximize the composite image quality.

In one embodiment, image selection proceeds according to the following algorithm:

1. Detect contrast arrival (either expressed as a time point or an image frame). In one embodiment, the upper ¼ lines are used in evaluating image quality function. The contrast agent usually first appears in the upper part of the image. Thus, in one embodiment, "arrival" of contrast in an image is detected by noting a sharp increase in quality based on calculating the quality for the upper portion.

2. Set the candidate set of mask images.

3. Set the candidate set of arterial phase images.

4. Select the best single mask image $M_{SingleBest}$ and the best single arterial phase image $A_{SingleBest}$, sometimes referred to as the "pair."

Among all possible subtraction pairs of a single mask image and a single arterial phase image, select the pair that maximizes the image quality of the filtered image. Simplification parameters that expedite selection are to use $y_{init}=17$, $y_{final}=256-32$, $y_{step}=16$.

5. Initialize all elements of the current set of best mask images to be the best single mask ($M_{CurrentBest}=M_{SingleBest}$).

6. Initialize all elements of the current set of best arterial phase images to be the best single arterial phase image ($A_{CurrentBest}=A_{SingleBest}$).

7. By using the current set of best mask images, determine the set of best arterial phase images which yields the best subtraction image.

For example, in one embodiment, this entails:

(i) Sorting the arterial phase images based on the current set of best mask images;

(ii) Initializing the current set of arterial phase images as the best single arterial phase image chosen in sub-step (i);

(iii) Adding the next arterial phase image to the current set of best arterial phase images if it improves the image quality of the filtered image;

(iv) Repeating sub-step (iii) for all the arterial phase images.

8. By using the current set of best arterial phase images, find the set of best mask images that gives the best subtraction image. In one embodiment, this entails the routines described in step 7 above.

9. Repeat steps 7 and 8 until convergence.

In one embodiment, the above process is expedited by reducing the number of quality evaluations to approximately 100.

In one embodiment, an image quality function is evaluated to identify the arterial signal by selecting the few brightest pixels in a line perpendicular to the artery of interest and the sharpest increase in the image quality corresponds to the contrast bolus arrival in the artery of interest.

By maximizing the image quality, an iterative algorithm is used to select mask images and arterial phase images to generate a linearly filtered image of the highest quality.

This automatic algorithm for selecting optimal masks and arterial phase images in 45 patients including 26 males and 19 females (mean age=70 years) produced a final image judged by two human reviewers to be nearly equivalent to the composite image produced by manually selecting the mask and arterial phase images. This automation of the mask selection process significantly reduces the time and effort required to analyze these data.

In one embodiment, the image quality measure is evaluated for both left and right legs together. When motion of the left leg and motion of right leg are different, the optimal selection for the overall image quality may not be the optimal for both legs. In one embodiment, separate optimization for each leg is used. In one embodiment, images for both legs are merged.

Alternative Embodiments

In one embodiment, a method is provided to receive a temporal sequence of magnetic resonance images for a particular region where each image includes a plurality of pixels and wherein a contrast agent is introduced into the region at an introduction time occurring during the time sequence. The method includes, for each pixel, determining whether it corresponds to artery, vein or background tissue based upon its temporal behavior and creating a final image in which pixels corresponding to arteries are bright and pixels corresponding to veins or background tissue are dark.

In one embodiment, the method includes determining an intensity for each pixel in the final image based on the standard deviation of the temporal sequence of pixels corresponding to that location. In one embodiment, the method includes determining an intensity for each pixel in the final image based on:

i. manually selecting images in the temporal sequence that correspond to the arterial phase for addition;

ii. manually selecting images corresponding to before arrival of contrast for subtraction; and iii. for each pixel location taking the average of corresponding pixels in the subtraction images and subtracting that average from the average of the corresponding pixels in the addition images.

In one embodiment, the method includes first eliminating k-space data corrupted by motion.

In one embodiment, the method includes reducing background tissue signal enhancement in the final image by including an image acquired after the arterial phase of the bolus in the subtraction average.

In one embodiment, the method is performed automatically by a computer.

According to one embodiment, the data from multiple sequential images is considered in enhancing arterial phase data. For example, by discerning the temporal behavior of each pixel, and selecting those pixels that correspond to pixels illustrating an artery, the image can be enhanced. In one embodiment, the temporal behavior of each corresponding pixel is calculated to determine those pixels having the greatest variation, and thus, those pixels corresponding to an artery bearing a contrast agent.

In one embodiment, an algorithm is executed to plot the standard deviation of each pixel over time. By evaluating standard deviation as a function of time will tend to enhance arteries and suppress background regions.

In one embodiment, the user is prompted to identify one or more regions, or spots, in an image corresponding to an artery or background. A processor of the present subject matter then executes and algorithm to identify other pixels having temporal behavior consistent with that identified as an artery or background. Thus, pixels corresponding to arteries are enhanced and those pixels corresponding to background are suppressed.

In one embodiment, the user is prompted to identify a region of background tissue which then serves as a means of re-registering the images to eliminate a motion artifact.

In one embodiment, motion artifacts are suppressed by aligning an air-tissue interface on un-subtracted images and then proceeding with the averaging process.

In one embodiment, motion artifacts are suppressed by identifying motion corrupted lines of k-space data and removing those lines before averaging and subtracting.

In one embodiment, a mouse or other user input device coupled to a processor of the present subject matter is used to make image selection choices. For example, in one embodiment, a left mouse button is used to toggle mask images into or out of a set of images for purposes of calculating an average mask image. As another example, in one embodiment, a right mouse button is used to toggle mask images into or out of a set of images for purposes of calculating an arterial image. Other configurations of mouse buttons and functionality are also contemplated.

In one embodiment, the present subject matter includes a device or system to perform a method described herein. For example, in one embodiment, a system includes a processor and a selector module. The processor is adapted to receive a time sequence of magnetic resonance images for a region where each image has a plurality of pixels. Arrival of a contrast agent into the region occurs at an introduction time during the time sequence. The selector module is adapted for selecting a first subset of at least one image from the time sequence of magnetic resonance images where each image of the first subset corresponds to a time prior to the introduction time. In addition, the selector module is adapted for selecting a second subset of at least two images from the time sequence of magnetic resonance images where each image of the second subset corresponds to a time subsequent to the introduction time. The system also includes instructions accessible to the processor and adapted to calculate a mask image as a function of corresponding pixels of each image of the first subset and to calculate an arterial image as a function of corresponding pixels of each image of the second subset. The processor also includes instructions to generate a composite image as a function of a difference between each pixel of the mask image and a corresponding pixel of the arterial image.

The processor, in various embodiments, includes a microprocessor or computer. The selector module, in various embodiments, includes a processor controlled circuit, an electrical circuit, hardware or other structures for performing as described herein.

In one embodiment, the system includes a monitor coupled to the processor and adapted to display the composite image. In one embodiment, a user operable controller is coupled to the selector module. The user operable controller is adapted to select at least one of any combination of the first subset and the second subset. In one embodiment, the user operable controller includes a mouse, trackball or other controller. In one embodiment, the system includes a memory coupled to the processor and adapted to store data corresponding to the time sequence of magnetic resonance images.

In one embodiment, the present subject matter includes a device having a processor and a selector module. The processor is adapted to receive a magnetic resonance image having a plurality of rows of pixels where each pixel has an intensity. In various embodiments, the intensity of each pixel is expressed as a numerical value (scaler) or a complex value having both a real part and an imaginary part (vector). The selector module is adapted to select a subset of rows in the image. In one embodiment, the selector module is processor controlled. In one embodiment, the selector module includes a user-operable mouse or other controller. The device also includes a foreground identifier and a background identifier, both coupled to the processor and adapted to identify pixels in each row of the subset of rows where each foreground pixel has an intensity greater than a first predetermined threshold and where each background pixel has an intensity less than a second predetermined threshold. In one embodiment, the foreground identifier and background identifier includes a user operable mouse or other controller. In one embodiment, the processor identifies a suggested pixel or region of pixels and the user is prompted to affirm the suggested selection. The first and second predetermined threshold, in various embodiments, include user selected values or calculated based on a percentile intensity level of a row of pixels. The processor is adapted to execute instructions to calculate a quality measure as a function of a difference of an average intensity of each foreground pixel and an average intensity of each background pixel. In one embodiment, the quality measure is determined by a user selected function. In one embodiment, a memory is memory coupled to the processor and adapted to store the quality measure.

CONCLUSION

The above description is intended to be illustrative, and not restrictive. Many other embodiments will be apparent to those of skill in the art upon reviewing the above description.

What is claimed is:

1. A system comprising:
a processor adapted to receive a time sequence of magnetic resonance images for a region, each image having a plurality of pixels and wherein arrival of a contrast agent into the region at an introduction time occurs during the time sequence;

a selector module for selecting a first subset of at least one image from the time sequence of magnetic resonance images, each image of the first subset corresponding to a time prior to the introduction time and for selecting a second subset of at least two images from the time sequence of magnetic resonance images, each image of the second subset corresponding to a time subsequent to the introduction time; and wherein the processor includes instructions to calculate a mask image as a function of corresponding pixels of each image of the first subset and to calculate an arterial image as a function of corresponding pixels of each image of the second subset; and wherein the processor includes instructions to generate a composite image as a function of a difference between each pixel of the mask image and a corresponding pixel of the arterial image.

2. The system of claim 1 further including a monitor coupled to the processor and adapted to display the composite image.

3. The system of claim 1 further including a user operable controller coupled to the selector module wherein the user operable controller is adapted to select at least one of any combination of the first subset and the second subset.

4. The system of claim 3 wherein the user operable controller includes a mouse.

5. The system of claim 1 further including a memory coupled to the processor and adapted to store data corresponding to the time sequence of magnetic resonance images.

* * * * *

UNITED STATES PATENT AND TRADEMARK OFFICE
CERTIFICATE OF CORRECTION

PATENT NO. : 7,734,078 B2  Page 1 of 1
APPLICATION NO. : 12/475797
DATED : June 8, 2010
INVENTOR(S) : Martin R. Prince et al.

It is certified that error appears in the above-identified patent and that said Letters Patent is hereby corrected as shown below:

On the face page, in field (54), in "Title", in column 1, line 2, delete "SUBSTRACTION" and insert -- SUBTRACTION --, therefor.

In column 1, line 2, delete "SUBSTRACTION" and insert -- SUBTRACTION --, therefor.

In column 1, lines 8-10, delete "which is going to issue as a patent on Jun. 9, 2009 under U.S. Pat. No. 7,545,967," and insert -- now issued on Jun. 9, 2009 as U.S. Pat. No. 7,545,967, --, therefor.

Signed and Sealed this

Twenty-fourth Day of August, 2010

David J. Kappos
*Director of the United States Patent and Trademark Office*